United States Patent [19]

Effron

[11] 4,179,352

[45] Dec. 18, 1979

[54] COAL LIQUEFACTION PROCESS

[75] Inventor: Edward Effron, Springfield, N.J.

[73] Assignee: Exxon Research & Engineering Co., Florham Park, N.J.

[21] Appl. No.: 602,956

[22] Filed: Aug. 7, 1975

[51] Int. Cl.$^2$ .............................................. C10G 1/00
[52] U.S. Cl. .................................................. 208/8 LE
[58] Field of Search ............................................. 208/8

[56] References Cited

U.S. PATENT DOCUMENTS

| | | | |
|---|---|---|---|
| 3,505,203 | 4/1970 | Nelson | 208/8 |
| 3,645,885 | 2/1972 | Harris et al. | 208/8 |
| 3,700,583 | 10/1972 | Salamony et al. | 208/8 |
| 3,726,784 | 4/1973 | Correa et al. | 208/8 |
| 3,726,785 | 4/1973 | Keller et al. | 208/8 |

*Primary Examiner*—Delbert E. Gantz
*Assistant Examiner*—William G. Wright
*Attorney, Agent, or Firm*—J. E. Reed

[57] ABSTRACT

A hydrogenated liquid product is obtained from coal by treating the feed coal with hydrogen-containing gas and a hydrogen-donor solvent in a coal liquefaction reactor, separating the liquefaction reactor product into a vaporous fraction and a normally liquid hydrocarbon fraction, treating the vaporous fraction for the removal of ammonia and acid gases, fractionating the normally liquid hydrocarbon fraction to obtain a distillate fraction and a bottoms fraction boiling above about 1000° F., and thereafter introducing the treated vaporous fraction and at least a portion of the distillate fraction, along with fresh hydrogen, into a catalytic solvent hydrogenation reactor for the production of solvent and additional product liquids. The hydrogenated product is separated into a recycle vapor stream and a liquid stream which is subsequently fractionated to produce naphtha, recycle solvent, additional liquid products, and a bottoms fraction which can be upgraded by hydrogenation, coking, catalytic cracking or the like. This process results in improved catalyst life and activity in the solvent hydrogenation reactor, reduces the gas input to the hydrogenation reactor, reduces the necessity for purging gas from the system, and has other advantages.

10 Claims, 1 Drawing Figure

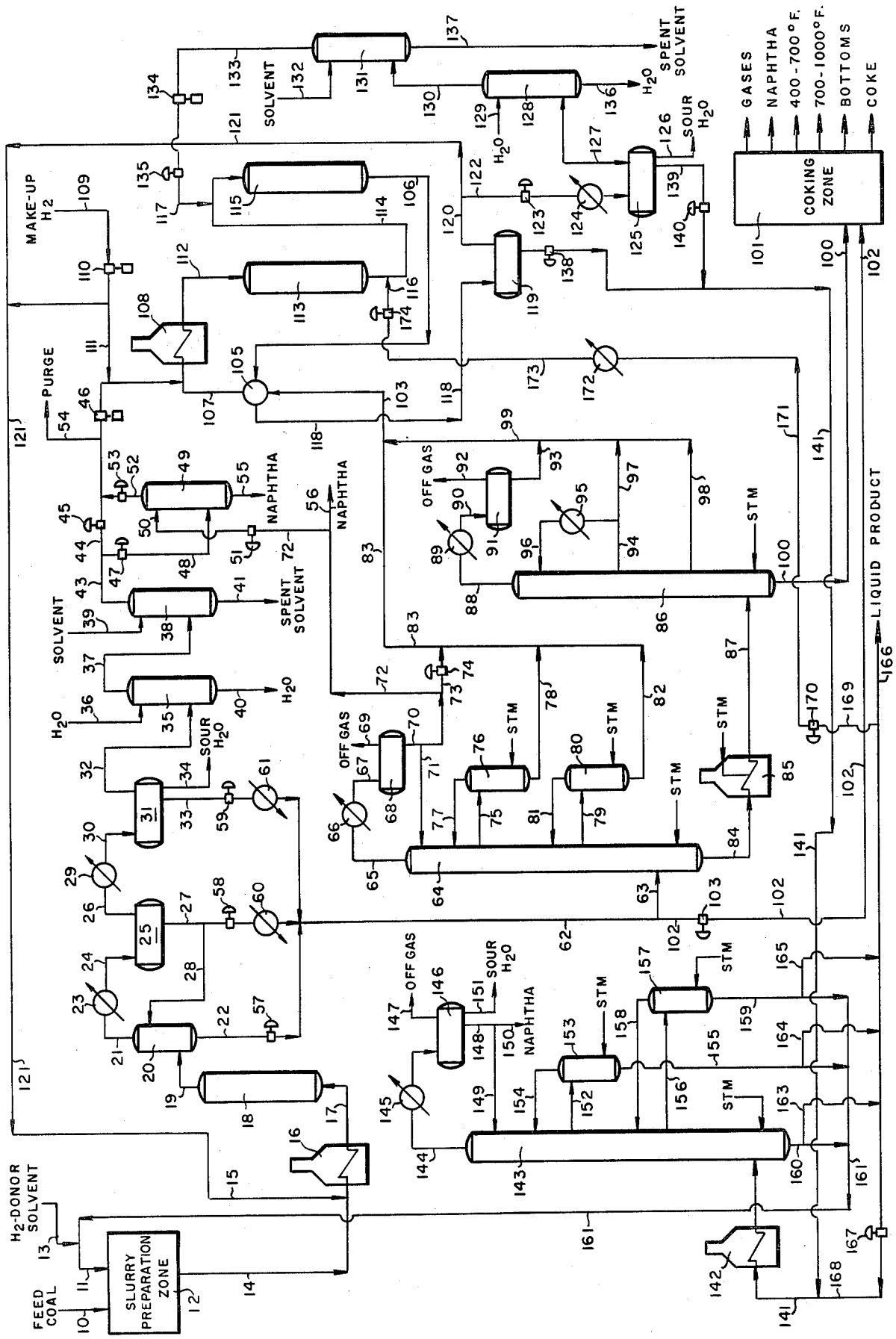

COAL LIQUEFACTION PROCESS

BACKGROUND OF THE INVENTION

1. Field of the Invention

This invention relates to coal liquefaction and is particularly concerned with liquefaction processes wherein coal liquids produced by the extraction of coal with a hydrogen-donor solvent are subsequently hydrogenated for the production of solvent and additional liquid products.

2. Description of the Prior Art

A number of different processes have been developed for the production of liquid hydrocarbons from coal. Among the most promising of these are processes in which the feed coal is first contacted with a hydrogen-containing gas and a hydrogen-donor solvent at elevated temperature and pressure in a liquefaction reactor and a portion of the liquid product is then catalytically hydrogenated in a solvent hydrogenation reactor to generate additional liquid products and solvent for recycle to the liquefaction step. Hydrogenation of the liquid is generally carried out at a pressure substantially the same as that in the liquefaction reactor and at a somewhat lower temperature. To supply the heat required for hydrogenation of the liquid, all of the vaporous product taken overhead from the liquefaction reactor is passed directly to the solvent hydrogenation reactor without cooling. The liquid effluent from the liquefaction step is normally passed to a low pressure separator in which gases are taken off and then fractionated, the lighter constituents being employed as feed to the solvent hydrogenation reactor and the heavier material being upgraded by hydrogenation, catalytic cracking, coking or the like. Hydrogen in addition to that contained in the vapors taken overhead from the liquefaction reactor is supplied to the solvent hydrogenation reactor by separating gases from the hydrogenation reactor product, scrubbing these gases to remove ammonia and other constituents, and then recycling the remaining gas with makeup hydrogen to the hydrogenation reactor. A portion of this recycle stream is also recycled to the liquefaction reactor. Liquid products from the solvent hydrogenation reactor are fractionated following recovery of the gas, the lighter constituents being taken overhead for use as fuel or the like and the heavier constituents being recycled for use as solvent or recovered as additional product.

Although the process outlined above has numerous advantages over other liquefaction processes, studies and experimental work have shown that the catalyst employed in the solvent hydrogenation reactor tends to lose activity and must be regenerated or replaced at relatively frequent intervals. In addition, substantial quantities of makeup hydrogen are required in the process and relatively large volumes of gas must be purged from the recycle gas stream to maintain the required hydrogen partial pressure in the system. These and associated problems add significantly to the operating cost of the process and tend to restrict its application.

SUMMARY OF THE INVENTION

The present invention provides an improved process for the preparation of liquid products from coal or similar liquefiable carbonaceous solids which at least in part alleviates the difficulties outlined above and permits the manufacture of such products at lower costs than has generally been possible heretofore. In accordance with the invention, it has now been found that hydrogenated liquid products can be produced from bituminous coal, subbituminous coal, lignite or a similar feed material by first treating the coal at elevated temperature and pressure with a hydrogen-containing gas and a hydrogen-donor solvent in a liquefaction reactor and then cooling the liquefaction reactor product to a temperature sufficient to permit separation of the product, preferably without a substantial reduction in pressure, into a gaseous fraction and a normally liquid hydrocarbon fraction. The gaseous fraction is treated for the removal of ammonia and acid gases, normally by scrubbing the gas with water to take out ammonia and hydrogen chloride and then contacting it with monoethanolamine, diethanolamine or a similar solvent for the removal of hydrogen sulfide, carbon dioxide, and the like.

The normally liquid hydrocarbon fraction is further fractionated to produce a distillate fraction and a bottoms fraction boiling above about 1000° F. The gaseous fraction, which will normally consist primarily of hydrogen and normally gaseous hydrocarbons, and at least a portion of the distillate fraction are then heated to hydrogenation temperature and introduced into a catalytic solvent hydrogenation reactor, preferably a staged reactor in which the product is quenched between stages, for the production of solvent and additional product liquids. The effluent from this reactor is then separated, preferably at substantially hydrogenation pressure, into a vapor fraction composed primarily of hydrogen and hydrocarbons boiling up to about 700° F. and a liquid fraction. The vapor fraction is recycled for introduction into the liquefaction reactor with additional feed coal and the liquid fraction is fractionated for the recovery of naphtha, solvent, additional liquid products, and a heavy bottoms fraction which can be upgraded by hydrogenation, coking, catalytic cracking, or the like.

The process of the invention eliminates constituents in the liquefaction effluent stream which would otherwise tend to adversely affect the catalyst employed in the solvent hydrogenation reactor, reduces the quantity of gas which must be contacted with the feed to the hydrogenation reactor, results in a substantial reduction in the amount of gas which must be purged from the system to maintain the hydrogen concentration at the required level, and has other advantages. These advantages make the process considerably more attractive than those proposed in the past.

BRIEF DESCRIPTION OF THE DRAWING

The drawing is a schematic diagram of a process for the production of liquid products from coal carried out in accordance with the invention.

DESCRIPTION OF THE PREFERRED EMBODIMENTS

In the process depicted in the drawing, feed coal is introduced into the system through line 10 from a coal storage or feed preparation zone not shown in the drawing and combined with a preheated hydrogen-donor solvent introduced through line 11 to form a slurry in slurry preparation zone 12. The feed coal employed will normally consist of solid particles of bituminous coal, subbituminous coal, lignite, brown coal, or a mixture of two or more such materials. The coal particle size may be on the order of about one-fourth inch or larger along the major dimension but will preferably be crushed and screened to a particle size of about 8 mesh or smaller on the U.S. Sieve Series Scale. It is generally preferred to dry the feed coal particles to remove excess water, either by conventional techniques before the solids are mixed with the solvent in the slurry preparation zone or by mixing the wet solids with hot solvent at a temperature above the boiling point of water, preferably between about 250° F. and about 350° F., to vaporize the water in the preparation zone. The moisture in the feed slurry is preferably reduced to less than about 2 weight percent.

The hydrogen-donor solvent used in preparing the coal-solvent slurry will normally be a coal derived solvent, preferably a hydrogenated recycle solvent containing at least 20 weight percent of compounds which are recognized as hydrogen donors at the elevated temperatures of from about 700° to about 900° F. generally employed in coal liquefaction reactors. Solvents containing at least 50 weight percent of such compounds are preferred. Representative compounds of this type include indane, $C_{10}$–$C_{12}$ tetrahydronaphthalenes, $C_{12}$ and $C_{13}$ acenaphthenes, di-, tetra- and octahydroanthracenes, tetrahydroacenaphthenes, crysene, phenanthrene, pyrene, and other derivatives of partially saturated aromatic compounds. Such solvents have been described in the literature and will be familiar to those skilled in the art. The solvent composition resulting from the hydrogenation of a recycle solvent fraction will depend in part upon the particular coal used as the feedstock to the process, the process steps and operating conditions employed, and the conditions used in hydrogenating the solvent fraction selected for recycle following with liquefaction. In the slurry preparation zone 12, the incoming feed coal is normally mixed with solvent recycled through line 11 in a solvent-to-coal ratio of from about 0.8:1 to about 2:1. The solvent employed on initial startup of the process and any makeup solvent required can be added to the system through line 13.

The coal-solvent slurry prepared as described above is withdrawn from slurry preparation vessel 12, passed through line 14, and introduced, together with vapor recycled through line 15, into mixed phase preheat furnace 16 where the feed materials are heated to a temperature within the range between about 750° F. and about 950° F. The mixture of hot slurry and recycle vapor withdrawn from the furnace through line 17 will contain from about 1 to about 8 weight percent, preferably from about 2 to about 5 weight percent, of hydrogen on a moisture and ash-free coal basis. This hot feed is then introduced into liquefaction reactor 18 which is maintained at a temperature between about 750° F. and about 950° F. and at a pressure between about 1000 psig and about 3000 psig, preferably between about 1500 and about 2500 psig. Although a single liquefaction reactor is shown in the drawing, a plurality of upflow or other type reactors arranged in parallel or series can also be employed. The liquid residence time within reactor 18 will normally range between about 5 minutes and about 100 minutes and will preferably be from about 10 to about 60 minutes.

Within the liquefaction zone, high molecular weight constituents of the coal are broken down and hydrogenated to form lower molecular weight gaseous, vapor and liquid products. The hydrogen-donor solvent contributes hydrogen atoms which react with organic radicals liberated from the coal and prevent their recombination. The hydrogen in the recycle vapor stream injected with the slurry serves as replacement hydrogen for depleted hydrogen-donor molecules in the solvent and results in the formation of additional hydrogen-donor molecules by in situ hydrogenation. The process conditions within the liquefaction zone are selected to insure the generation of sufficient hydrogen-donor precursors and at the same time provide sufficient liquid product for proper operation of the solvent hydrogenation zone. These conditions may be varied as necessary.

A liquefaction reactor product stream including gaseous liquefaction products such as carbon monoxide, carbon dioxide, ammonia, hydrogen, hydrogen sulfide, methane, ethane, ethylene, propane, propylene and the like, unreacted hydrogen from the feed slurry, solvent, and heavier liquefaction products is taken off overhead from the liquefaction reactor through line 19. This stream is passed to reactor effluent separator 20 where it is separated at substantially liquefaction reactor pressure and at a temperature only slightly lower than that in the liquefaction reactor into an overhead vapor stream which is withdrawn through line 21 and a liquid stream taken off through line 22. The vapor stream is passed through heat exchanger 23 where it is cooled to a temperature between about 400° and about 700° F. and then introduced through line 24 into hot liquefaction separator 25, still at substantially liquefaction pressure. Gases and vapors are withdrawn from hot separator 25 through line 26 and liquids are taken off through line 27. A portion of the liquid stream may be recycled through line 28 to reactor effluent separator 20 as wash oil. The gases and vapors in line 26 pass through heat exchanger 29 where they are further cooled, preferably to substantially atmospheric temperature, without any substantial reduction in pressure. From the heat exchanger, the gases and vapors flow through line 30 into cold liquefaction separator 31 where a further separation takes place. An overhead stream containing hydrogen, carbon monoxide, carbon dioxide, ammonia, hydrogen sulfide, hydrogen chloride, normally gaseous hydrocarbons, and some naphtha boiling range hydrocarbons is withdrawn through line 32. A liquid stream containing dissolved gases but composed primarily of hydrocarbons boiling below about 700° F. at atmospheric pressure is recovered through line 33. A sour water stream produced by the condensation of water vapor is withdrawn from separator 31 through line 34.

The gases and vapors recovered from the cold liquefaction separator are passed through line 32 into liquefaction water scrubber 35 where they are contacted with water introduced through line 36 for the removal of ammonia, hydrogen chloride, and other water-soluble constituents. The scrubber may be a conventional spray type unit, a venturi scrubber, or the like. The scrubber gas and vapor is then passed through line 37 to solvent scrubber 38 where it is contacted with monoethanolamine, diethanolamine or a similar solvent introduced through line 39 for the removal of hydrogen sulfide, carbon dioxide and other acid gases. The spent scrubber water is withdrawn from scrubber 35 through line 40. The spent solvent withdrawn from the solvent scrubber through line 41 is passed to a solvent recovery unit not shown in the drawing for the removal of the absorbed materials and regeneration of the solvent. The regeneration step is generally carried out by flashing and steam stripping but the particular method employed will depend upon the solvent selected, the contaminants present in the spent solvent stream, and other factors.

The gases and accompanying vapors from which ammonia and acid gases have been removed are taken overhead from the solvent scrubber 38 through line 43. This stream may be passed through line 44 and valve 45 directly to solvent hydrogenation feed compressor 46. Alternatively, valve 45 can be closed and valve 47 opened to divert the flow through line 48 to naphtha scrubber 49. Here the gas and vapors are countercurrently contacted with naphtha introduced through line 50 and valve 51 for the removal of carbon monoxide, methane and higher hydrocarbons. This naphtha scrubbing step results in a higher purity treated gas, and reduces the purge requirements of the system. The treated gas is introduced into line 44 through line 52 and valve 53. The gas or mixture of gas and vapors fed to the solvent hydrogenation compressor through line 44 will normally include carbon monoxide and light hydrocarbon gases not removed in the scrubbers. A portion of the gas or mixture of gas and vapor will normally be purged through line 54 to prevent the buildup of these materials in the system. The scrubber naphtha is recovered through line 55 and may be further processed to remove absorbed materials.

As indicated earlier, the naphtha scrubbing step described in the preceding paragraph is not an essential feature of the process of the invention and may be omitted by passing the gases and vapors leaving the solvent scrubber directly to the solvent hydrogenation feed compressor 46. This not only permits elimination of the naphtha scrubber itself but also obviates the need for additional facilities to remove absorbed materials from the spent naphtha stream. The higher purge rate necessitated by elimination of the scrubbing step is a disadvantage but in many cases this mode of operation will be preferred. The naphtha, if not used for scrubbing purposes, can be withdrawn through line 56.

The liquid stream withdrawn from reactor effluent separator 20 through line 22 is passed through pressure letdown valve 57 where the pressure is reduced to about 100 psia or less. The liquids withdrawn from the hot liquefaction separator 25 through line 27 and from the cold liquefaction separator 31 through line 33 are passed through pressure letdown valves 58 and 59 respectively, where the pressures are reduced to a similar level, and are then heated in heat exchangeers 60 and 61 to a temperature approaching that of the liquid in line 22. These three hot liquid streams are fed through lines 62 and 63 to atmospheric fractionation unit 64.

In the atmospheric fractionation unit, the feed is fractionated and an overhead fraction composed primarily of gases and naphtha constituents boiling up to about 400° F. is withdrawn overhead through line 65. This overhead fraction is cooled in exchanger 66 and passed via line 67 to fractionator distillate drum 68 where the gases are taken off overhead through line 69. This gas stream may be employed as a fuel gas for the generation of process heat or used for other purposes. The liquids product from distillate drum 68 is withdrawn through line 70 and a portion of the naphtha may be returned through line 71 to the upper part of the fractionating column as reflux. The remaining naphtha may be passed through line 72, valve 51 and line 50 to scrubber 49 for use in absorbing carbon monoxide and normally gaseous hydrocarbons as described earlier. This recovery of naphtha from the liquefaction product stream and its use for the removal of carbon monoxide and low molecular weight hydrocarbons from the vapor stream permits the elimination of vapor stream constituents which otherwise tend to substantially reduce the effective hydrogen partial pressure in the solvent hydrogenation reactor and promote lower catalyst activity and higher deactivation rates. Alternatively, the naphtha can be passed through line 73 and valve 74 and used as feed for the solvent hydrogenation unit as described hereafter. This stream can also be recovered as product naphtha.

One or more intermediate fractions boiling within the range between about 250° F. and about 700° F. is withdrawn from atmospheric fractionation column 64 for use as feed to the solvent hydrogenation reactor. It is generally preferred to recover a relatively light fraction composed primarily of constituents boiling below about 500° F. by means of line 75, stripper 76, reflux line 77, and line 78 and to recover a heavier intermediate fraction composed primarily of constituents boiling below about 700° F. by means of line 79, stripper 80, reflux line 81, and line 82. These two distillate fractions, plus a lower boiling overhead fraction if naphtha is not used for scrubbing purposes or withdrawn as product, are passed through line 83 for use as liquid feed to the solvent hydrogenation unit. The bottoms fraction from the atmospheric column, composed primarily of constituents boiling in excess of about 700° F. is withdrawn through line 84, heated to a temperature of about 600° to 775° F. in furnace 85, and introduced into vacuum fractionation unit 86 through line 87.

In the vacuum fractionation column, the feed is distilled under reduced pressure to permit the recovery of an overhead fraction which is withdrawn through line 88, cooled in heat exchanger 89, and then passed through line 90 into distillate drum 91. Gases and vapors which may be used as fuel are taken off through the line 92 and liquids are withdrawn through line 93. A heavier intermediate fraction, one composed primarily of constituents boiling below about 850° F., for example, may be recovered by means of line 94, heat exchanger 95, reflux line 96, and line 97. A still heavier sidestream may be withdrawn through line 98. These three distillate fractions are passed through line 99 for use as feed to the solvent hydrogenation unit. A bottoms fraction boiling in excess of about 1000° F. and containing unreacted coal residues is withdrawn from the vacuum fractionation column through line 100 and may be gasified for the production of hydrogen, used as a coking or catalytic cracking feedstock, or upgraded in other ways. In the system shown in the drawing, this heavy bottoms is sent to coking unit 101 for upgrading into lighter products.

There are several alternates to the fractionation step described above which may be employed if desired. One such alternate, for example, is to pass the liquid stream from the reactor effluent separator and liquefaction separators to a centrifuge, gravity settling unit, filter or the like for the removal of unreacted coal solids from the liquids prior to fractionation. Antisolvents such as hexane, decalin or certain petroleum hydrocarbon liquids can be added to the liquefaction products to facilitate separation of the unreacted coal and ash from the liquids and permit their removal from the system. Processes of this type have been described in the literature and will be familiar to those skilled in the art. The liquids remaining following the solids separation step can then be separated by fractionation into a naphtha fraction which may be used in scrubber 49 or fed to the solvent hydrogenation unit, one or more intermediate streams to be fed to the solvent hydrogenation reactor, and, if desired, a heavier fraction which can be upgraded by hydrocracking and other downstream processing.

Another alternate procedure which is advantageous is to pass the liquid stream from the reactor effluent separator 20 and liquefaction separators 25 and 31 through line 102 containing valve 103 to coking zone 101, preferably a fluid bed coker, where the liquids are upgraded by thermal cracking and other reactions. The coking unit will normally include a coker fractionation tower in which the vaporized products from the coker are distilled to produce an overhead gas stream, a naphtha stream which can be used as the naphtha supplied to scrubber 49 if desired, a relatively light liquid stream boiling between about 400° and about 700° F. for use as feed to the solvent hydrogenation reactor, a heavier fraction in the 700° to 1000° F. boiling range for use as either feed to the solvent hydrogenation reactor or product oil sent to downstream processing units for upgrading, and a heavier bottoms product which may be used as feed to a gasification unit in which hydrogen is produced or upgraded in various ways. The coking unit will also produce fluid coke. This can be subsequently gasified to produce hydrogen or employed for other purposes. Still other modifications in the initial handling of the liquid product from the liquefaction reaction which may be employed to produce naphtha, solvent hydrogenation reactor feed, and products suitable for upgrading will suggest themselves to those skilled in the art.

The liquid feed available for the solvent hydrogenation reactor includes, as pointed out above, liquid hydrocarbons composed primarily of constituents in the 250° to 700° F. boiling range recovered from atmospheric fractionation unit 64 through line 83 and a similar stream recovered from coking zone 101. It may also include heavier hydrocarbons in the 700° to 1000° F. range recovered from vacuum fractionation unit 86 through line 99 and from coking zone 101 or the like. These hydrogenation reactor feed components are combined in line 103 and passed through heat exchanger 105, where they are heated by indirect heat exchange with the hydrogenated product withdrawn from the hydrogenation reactor through line 106. The preheated feed stream, at a temperature of from about 450° to 600° F., for example, is withdrawn from the heat transfer unit through line 107 and fed into solvent hydrogenation unit furnace 108, together with gas or a mixture of gas and vapor from compressor 46 and makeup hydrogen introduced into the system by means of line 109, compressor 110, and line 111. In the furnace, the combined feed is heated to the solvent hydrogenation temperature and then introduced into the hydrogenation reactor through line 112. The particular reactor shown in the drawing is a two-stage downflow unit including an initial stage 113 connected by line 114 to a second stage 115 but other type reactors can be used if desired.

The solvent hydrogenation reactor is preferably operated at a pressure somewhat higher than that in liquefaction reactor 18 and at a somewhat lower temperature than that in the liquefaction reactor. The temperature, pressure and space velocity employed in the reactor will depend to some extent upon the character of the feed stream employed, the solvent used, and the hydrogenation catalyst selected for the process. In general, temperatures within the range between about 550° F. and about 850° F., pressures between about 800 psig and about 3000 psig, and space velocities between about 0.3 and about 3 pounds of feed/hour/pound of catalyst are suitable. Hydrogen treat rates within the range between about 500 and about 12,000 standard cubic feet per barrel may be used. It is generally preferred to maintain a mean hydrogenation temperature within the reactor between about 675° F. and about 750° F., a pressure between about 1500 and about 2500 psig, a liquid hourly space velocity between about 1 and about 2.5 pounds of feed/hour/pound of catalyst and a hydrogen treat rate within the range between about 500 and about 4000 standard cubic feet per barrel.

Any of a variety of conventional hydrotreating catalysts may be employed in the process. Such catalysts typically comprise an alumina or silica-alumina support carrying one or more iron group metal and one or more metal from Group VI-B of the Periodic Table in the form of an oxide of sulfide. Combinations of one or more Group VI-B metal oxide or sulfide with one or more Group VIII metal oxide or sulfide are generally preferred. Representative metal combinations which may be employed in such catalysts include oxides and sulfides of cobalt-molybdenum, nickel-molybdenum-tungsten, cobalt-nickel-molybdenum, nickel-molybdenum, and the like. A suitable catalyst, for example, is a high metal content sulfided cobalt-molybdenum-alumina catalyst containing about 1 to 10 weight percent of cobalt oxide and about 5 to 40 weight percent of molybdenum oxide, preferably from 2 to 5 weight percent of the cobalt oxide and from about 10 to 30 weight percent of the molybdenum oxide. Other metal oxides and sulfides in addition to those specifically referred to above, particularly the oxides of iron, nickel, chromium, tungsten and the like, can also be employed. The preparation of such catalysts has been described in the literature and is well known in the art. Generally, the active metals are added to the relatively inert carrier by impregnation from aqueous solution and this is followed by drying and calcining to activate the catalyst. Carriers which may be employed include activated alumina, activated alumina-silica, zirconia, titania, bauxite, bentonite, montmorillonite, and mixtures of these and other materials. Numerous commercial hydrogenation catalysts are available from various catalyst manufacturers and can be used.

The hydrogenation reaction which takes place in reactor stages 113 nd 115 is an exothermic reaction in which substantial quantities of heat are liberated. The temperature within the reactor is controlled to avoid overheating and runaway reaction or undue shortening of the catalyst life by controlling the feed temperature and by means of a liquid or gaseous quench stream introduced between the two stages. The quantity of quench fluid injected into the system will depend in part upon the maximum temperature to which the catalyst is to be subjected, characteristics of the feed to the reactor, the type of quench used, and other factors. In general, it is preferred to monitor the reaction temperatures at various levels within each stage of the reactor by means of thermo-couples or the like and regulate the amount of feed and quench admitted so that the temperature does not exceed a predetermined maximum for that level. By increasing the amount of feed through line 112 and the amount of quench through line 116 or 117 whenever the temperature at the corresponding point in the reactor becomes too high, the overall reaction temperature can be maintained within predetermined bounds. If the hydrogenation reaction is to be carried out in the lower part of the 550° F. to 800° F. range, as may be the case when coal liquids of relatively low specific gravity and low sulfur and nitrogen content are being hydrogenated, a somewhat greater increase in temperature may be permissible than is the case where the hydrogenation reaction is to be carried out in the upper part of the 550° F. to 800° F. range. Operations of the latter type are frequently used for the hydrogenation of liquid products having higher sulfur and nitrogen contents and greater specific gravities. The optimum temperature and other conditions for a particular feedstock and catalyst system can be readily determined.

The hydrogenated effluent from the second stage 115 of the reactor is withdrawn through line 106 and, after passing in indirect heat exchange with the feed stream in heat transfer unit 105, is passed through line 118 into high pressure liquid gas separator 119 from which an overhead stream containing hydrogen gas is withdrawn through line 120. This gas stream is at least partially recycled through lines 121 and 15, together with makeup hydrogen from compressor 110, for reinjection with the feed slurry into liquefaction reactor preheat furnace 16.

If a gas quench is used in the solvent hydrogenation reactor, a portion of the gas stream from line 120 is withdrawn through line 122 and valve 123. This stream is cooled in heat exchanger 124 to a temperature sufficiently low to condense steam present in the gas and then passed to separator 125, from which the condensate is withdrawn as sour water through line 126. The overhead fraction from the separator is passed through line 127 to water scrubber 128 where it is countercurrently contacted with water introduced through line 129 for the removal of ammonia, hydrogen chloride and other water soluble constituentes. The scrubbed gas is then passed through line 130 into solvent scrubber 131 and is contacted with diethanolamine or a similar solvent admitted through line 132 for the removal of hydrogen sulfide, carbon dioxide, and the like. The gas from which ammonia and acid gases have been removed is passed through line 133, compressed in compressor 134 to a pressure sufficient to permit its reintroduction into the solvent hydrogenation reactor, and then passed through valve 135 and line 117 into the reactor as gaseous quench fluid. Water is withdrawn from scrubber 128 through line 136. Spent solvent from scrubber 131 is withdrawn through line 137 and passed to regenertion facilities not shown in the drawing.

Liquid hydrocarbons are withdrawn from separator 119, passed through pressure letdown valve 138, and combined with liquids withdrawn from separator 125, if any, through line 139 and valve 140. The combined stream is then passed through line 141 to final fractionator preheat furnace 142. As pointed out above, the solvent hydrogenation step may be carried out with either a gaseous or a liquid quench. If a liquid quench is employed, separator 125 and the associated scrubbers are not normally used and hence the only liquid sent to the fractionator preheat furnace will be that withdrawn from separator 119 through line 138.

In the final fractionator 143, preheated feed from furnace 142 is distilled to produce an overhead product composed primarily of gases and naphtha boiling range hydrocarbons. This stream is taken off overhead through line 144, passed through heat exchanger 145, and introduced into distillate drum 146. The off gases withdrawn through line 147 will be composed primarily of hydrogen and normally gaseous hydrocarbons but will include some normally liquid constituents in the naphtha boiling range. This stream can be used as a fuel or employed for other purposes. The liquid stream withdrawn from drum 146 through line 148, composed primarily of naphtha boiling range materials, is in part recycled as reflux through line 149 and in part recovered as product naphtha through line 150. A stream of sour water is also recovered from drum 146 through line 151. If desired, the naphtha recovered can be used in part for the removal of hydrocarbons and carbon monoxide from the gas stream in absorber 49.

One or more side streams boiling above the naphtha boiling range are recovered from fractionator 143. In the particular installation shown in the drawing, a first side stream composed primarily of hydrocarbons boiling up to about 700° F. is taken off through line 152 into stripper 153, the overhead fraction is returned as reflux through line 154, and the bottom fraction is withdrawn through line 155. A second side stream composed primarily of hydrocarbons boiling below about 850° F. is withdrawn from the fractionator through line 156 into stripper 157, a portion is returned as reflux through line 158, and the bottom fraction is withdrawn through line 159. A bottoms fraction composed primarily of hydrocarbons boiling below about 1000° F. is withdrawn from the fractionator through line 160. A portion of each of these three streams is recycled through line 161 and then through connecting line 11 for use as hydrogen-donor solvent in slurry preparation zone 12. The remaining fractionator liquids are withdrawn through lines 163, 164 and 165. These liquids may be withdrawn as liquid product through line 166, recycled in part to fractionator preheat furnace 142 through valve 167 and line 168 if a gas quench is used in the solvent hydrogenation step, or recycled in part through line 169, valve 170, line 171, heat exchanger 172, line 173, valve 174, and line 116 if a liquid quench is employed in the solvent hydrogenation step. The relative amounts of liquid thus recycled and recovered will depend upon the characteristics of the feed coal employed, the operating conditions selected, and other factors but in most cases substantial quantities of liquid products in addition to those produced in liquefaction bottoms treating zone 101 are recovered.

It will be apparent from the foregoing that the process of the invention provides an improved process for the liquefaction of coal and similar carbonaceous solids which has numerous advantages over processes advocated in the past. It results in greater solvent hydrogenation catalyst life, reduces the quantity of gas which must be contacted with the feed in the hydrogenation reactor, decreases the amount of purge necessary to maintain hydrogen partial pressures at the required levels, results in more effective utilization of the feed coal, provides better thermal efficiency, and permits lower overall operating costs than processes suggested heretofore. As a result of these and other advantages, the process represents a significant advance in the liquefaction art.

I claim:

1. A process for the production of liquid hydrocarbons from coal or similar liquefiable carbonaceous solids which comprises contacting said carbonaceous solids with a hydrogen-donor solvent and a hydrogen-containing gas under liquefaction conditions in a liquefaction zone and recovering a liquefaction effluent from said liquefaction zone; separating said liquefaction effluent into a vaporous stream and a liquids stream; treating at least a portion of said vaporous stream for the removal of ammonia and acid gas constituents and recovering a hydrogen-containing gaseous effluent; recovering a liquid hydrocarbon stream containing hydrogen-donor solvent constituents from said liquids stream; introducing said hydrogen-containing gaseous effluent and said liquid hydrocarbon stream into a catalytic solvent hydrogenation zone maintained under solvent hydrogenation conditions; recovering a hydrogenated effluent from said solvent hydrogenation zone; separating said hydrogenated effluent into a vaporous fraction containing molecular hydrogen and a liquids fraction; recycling at least a portion of said vaporous fraction including molecular hydrogen for introduction into said liquefaction zone; and recovering from said liquids fraction a liquid product stream and a recycle liquid stream for introduction as solvent into said liquefaction zone.

2. A process as defined by claim 1 wherein hydrocarbons and carbon monoxide are removed from at least a portion of said hydrogen-containing gaseous effluent before said gaseous effluent is introduced into said solvent hydrogenation zone.

3. A process as defined by claim 1 wherein the reaction in said catalytic solvent hydrogenation zone is controlled by quenching said reaction with a gas.

4. A process as defined by claim 1 wherein the reaction in said catalytic solvent hydrogenation zone is controlled by quenching said reaction with a hydrocarbon liquid.

5. A process as defined by claim 1 wherein a portion of said liquids stream separated from said liquefaction effluent is converted into lighter products by coking.

6. A process as defined by claim 1 wherein said liquid hydrocarbon stream containing said hydrogen-donor solvent constituents and a bottoms fraction are recovered from said liquids stream and said bottoms fraction is converted into lighter products by coking.

7. A process as defined by claim 1 wherein said catalytic solvent hydrogenation zone comprises two stages and the solvent hydrogenation reaction is quenched between stages.

8. A process as defined by claim 1 wherein said liquid hydrocarbon stream containing hydrogen-donor solvent constituents is recovered from said liquids stream by fractionation.

9. A process as defined by claim 2 wherein said hydrocarbons and carbon monoxide are removed from said gaseous effluent by scrubbing said gaseous effluent with naphtha.

10. A process as defined by claim 9 wherein said naphtha is produced by fractionating said liquids stream and recovering a naptha fraction and said liquid hydrocarbon stream containing said hydrogen-donor solvent constituents.

* * * * *